3,291,224
PERCUSSIVE HAMMERS AND THE LIKE
Max Arnold Stutz, 45 Clifton Way, London, England
Filed May 4, 1964, Ser. No. 364,660
Claims priority, application Great Britain, May 10, 1963,
18,613/63
3 Claims. (Cl. 173—49)

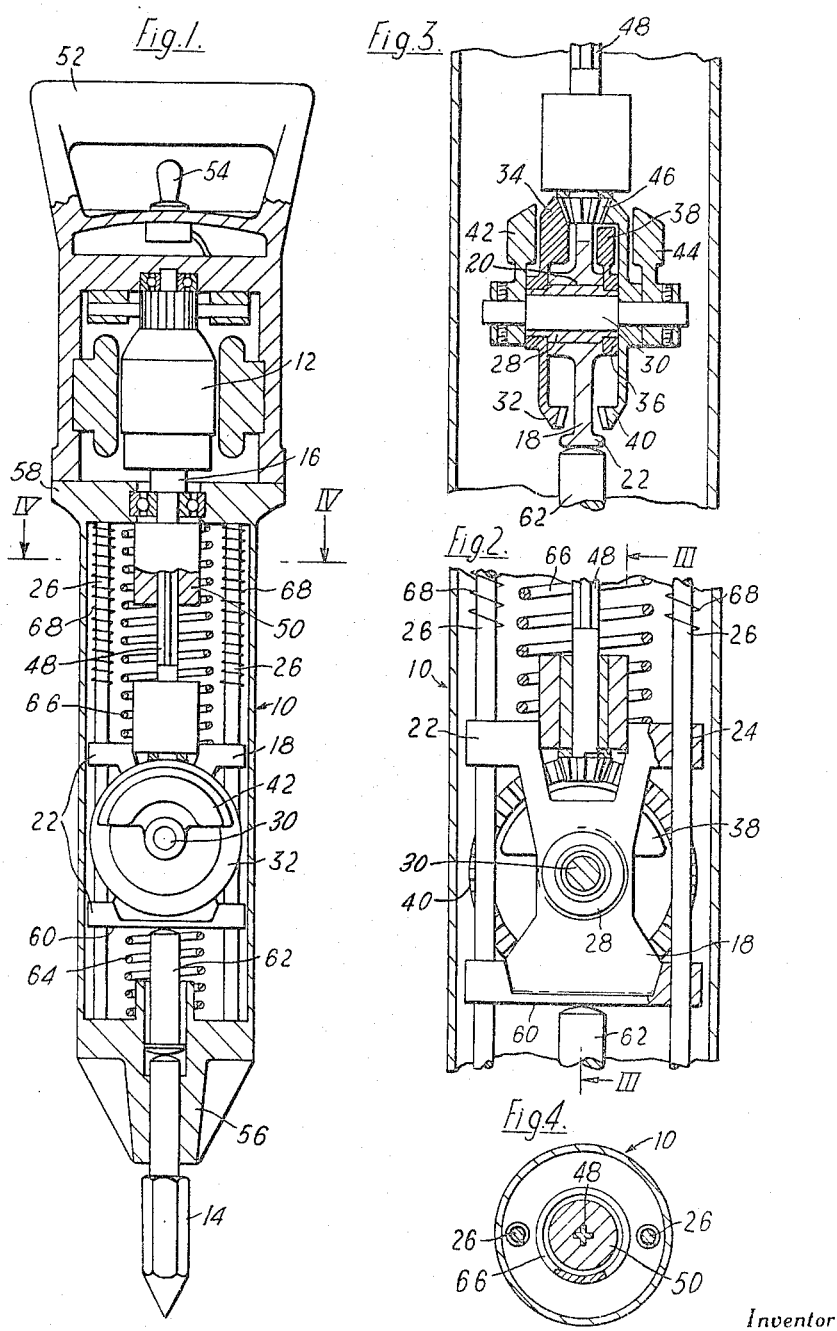

This invention relates to percussive apparatus such as hammers and vibratory power drills.

Among the percussive hammers and vibratory drills which are used nowadays are those which comprise a striker arranged to be reciprocated by the action of fly-weights of substantially equal mass and throw located on opposite sides of the striker, the weights being supported by shaft which is carried by the striker and which cuts its longitudinal axis of reciprocation at right angles. The shaft is rotated by bevel wheels in mesh with a driving pinion.

Hitherto this form of percussive apparatus has been constructed with one weight only located on each side of the striker, the two weights being rotated in opposite senses. This arrangement of the weights has the disadvantage, however, that it causes the apparatus to tend to rotate on its longitudinal axis first in one direction and then in the other direction as the weights rotate.

It is accordingly a primary object of the present invention to provide percussive apparatus which is free from the tendency mentioned above of rotating about its longitudinal axis.

Another object of the invention is to provide a construction wherein the mass of each fly-weight during use of the apparatus is balanced by another weight.

A further object is to reduce the frictional losses which occur as the striker is reciprocated.

Broadly, the percussive apparatus of the invention comprises a striker arranged to be reciprocated by rotary fly-weights mounted for rotation in opposite senses on opposite sides of the striker, in which each fly-weight is balanced by another fly-weight rigidly connected to it and arranged so that the two connected fly-weights lie one on each side of the striker.

It therefore follows that, in this form of construction the mass of each fly-weight during use of the apparatus is balanced and cancelled out by the balancing fly-weight connected to it. Moreover, as one pair of balanced weights rotates in one sense or direction and the other pair rotates in the opposite sense or direction, the apparatus has no tendency to yaw during operation.

The striker is preferably guided in its path of reciprocation by two parallel guide bars or rods secured to the case of the apparatus at their ends, the striker having hollow bosses or shoes on opposite sides of its longitudinal axis through which the guide bars or rods extend. This arrangement is found to result in a considerable reduction in frictional losses as compared with existing apparatus wherein the striker is guided by precision machined internal surfaces on the casing of the apparatus.

An example of percussive apparatus in accordance with the invention is shown in the accompanying drawing, in which FIGURE 1 is a vertical section through the apparatus;
FIGURE 2 is an enlarged part-sectional view of part of the apparatus shown in FIGURE 1;
FIGURE 3 is a section taken on the line III—III in FIGURE 2; and
FIGURE 4 is a section taken on the line IV—IV in FIGURE 1.

The percussive apparatus shown in the drawing comprises a tubular casing 10 having an electric driving motor 12 in its upper part and a percussive drill head 14 projecting downwards from a bore in its lower part. Rotation of the shaft 16 of the motor 12 is converted into reciprocatory movement of the drill head 14 by a striker 18 which has a transverse bore 20 and outwardly extending arms 22 provided with vertical bores 24 through which a pair of guide bars or rods 26 extend, the striker thereby being slidable on the rods and the parallel axes of the rods being equidistant from the axis of the transverse bore 20.

As shown in FIGURE 3, the bore 20 contains the major part of a rotatable sleeve 28 while the sleeve itself contains the major part of a rotatable shaft 30. Thus, the ends of the sleeve 28 project from the opposite faces of the striker, and the ends of the shaft 30 project from the ends of the sleeve. One projecting end of the sleeve has a bevel gear wheel 32 fixed to it co-axially, the wheel carrying a fly-weight 34 which is either attached to the wheel or forms an integral part of it. The other end of the sleeve has the hub 36 of a fly-weight 38 fixed to it, the centres of mass of the two fly-weights 34 and 38 being about equidistant from the vertical longitudinal axis of the striker.

A second bevel gear wheel 40 located on that side of the striker remote from the bevel gear wheel 32 is fixed to a projecting end of the shaft 30. Outside each bevel gear wheel is arranged a fly-weight 42, 44, the hubs of these two fly-weights being fixed to the extreme ends of the shaft 30. The centres of mass of the fly-weights 42 and 44 are about equidistant from the vertical longitudinal axis of the striker 18. All four fly-weights 34, 38, 42 and 44 are of substantially equal mass and all have about the same throw from the axis of the shaft 30, the arrangement being such that the mass centres of the respective weights reach their highest position simultaneously and their lowest position simultaneously as they rotate around the shaft axis at the same angular velocity.

As already mentioned above, the fly-weights 34 and 38 are rigidly connected together by the sleeve 28, while the fly-weights 42 and 44 are rigidly connected together by the shaft 30. It therefore follows that, during rotation of the fly-weights, the connected fly-weights 34 and 38 will balance each other, and that the other two fly-weights 42 and 44 will do the same.

Rotation of the two pairs of rigidly-connected fly-weights in opposite senses is effected by a bevel pinion 46 having its axis coincident with the vertical axis of the striker 18 and meshing on opposite sides with the bevel wheels 32 and 40. The pinion 46 is attached to a splined drive shaft 48 (see FIGURES 1 and 4) which is slidable in a cruciform or like slot in a rotatable block 50 carried on or forming part of the shaft 16 of the driving motor 12.

The top of the casing 10 has a handle 52 and a switch 54 for starting-up and stopping the motor 12. The drill head 14 at the lower end of the casing is secured to the casing by means not shown which permit limited axial movement of the drill head. Other tools such as percussive hammer-heads can be used in place of the drill head, depending on the work to be done by the apparatus. The guide bars or rods 26 are fixed in the end block 56 which holds the drill head 14, while the tops of the guide rods are fixed to a second block 58 which also carries the lower bearings for the shaft 16 of the motor 12.

When the motor 12 rotates the slotted block 50 in which the splined drive shaft 48 is slidable, the pinion 46 rotates the wheels 32 and 40 at the same speed as each other but in opposite senses or directions. The fly-weights 34 and 38 therefore rotate with the bevel gear wheel 32 in one direction, while the fly-weights 42 and 44 rotate with the bevel gear wheel 40 in the opposite direction. Rotation of the fly-weights brings about reciprocation of the striker 18, and at the end of each descent of the striker the central bottom part 60 of the striker delivers a blow to a free-transmitting rod 62 which in turn transmits the force of the blow to the drill head 14. Descent of the striker 18 is cushioned by a coil spring 64 arranged coaxially of the striker and supported by the block 56 to which the guide rods 26 are fixed. Alternatively, one or more cushioning springs may be arranged around each guide rod 26 between the said block 56 and the lower bored bosses on the striker. Ascent of the striker 18 is cushioned by a coil spring 66 arranged between the upper end of the striker 18 and the end block 58. Additional coil springs 68 are arranged around each of the rods 26 at its upper end, these additional springs being of such a length that they come into operation momentarily, that is to say, they are compressed by the ascending striker for brief periods only, in order to impart additional impetus to the striker at the moment when it begins to descend. The springs used, particularly the additional springs 68, are chosen so as to have a natural frequency which does not upset the rhythm of the reciprocation of the striker 18.

It will therefore be seen that the fly-weights in the percussive apparatus described above are balanced in such a way that any tendency for the apparatus to yaw is overcome.

I claim:

1. Percussive apparatus comprising a tubular casing, a driving motor mounted in the upper part of said casing, an axially-slidable drive shaft drivingly connected to said motor, a drive pinion on said drive shaft, a pair of co-axial, spaced-apart, substantially parallel bevel gear wheels arranged on opposite sides of the axis of said drive shaft in meshing engagement with opposite portions of said drive pinion whereby said bevel gear wheels are rotatable in opposite senses at the same speed of rotation, a reciprocatory tool-striker arranged between said bevel gear wheels, said casing having a bore in the lower part thereof, a reciprocatory percussive tool mounted in said bore for striking by said striker, means in said casing for guiding said tool-striker during reciprocatory movement thereof, a transverse bore in said striker, a rotatable transverse sleeve located at least partially in said transverse bore and having one end portion fixed to and supporting a first one of said bevel gear wheels, a rotatable transverse shaft located at least partially in said sleeve and having one end portion fixed to and supporting said second bevel gear wheel, a first fly-weight carried by said first bevel gear wheel, a second fly-weight fixed to and supported on said end portion of said transverse shaft on the outer side of said second bevel gear wheel, a third fly-weight fixed to and carried by said sleeve and located between said striker and said second bevel gear wheel, a fourth fly-weight fixed to and supported on the other end portion of said transverse shaft on the outer side of said first bevel gear wheel, said four fly-weights being of substantially equal mass and having substantially the same throw from the axis of said transverse shaft, said first and third fly-weights having the same angular position as each other on said sleeve, said second and fourth fly-weights also having the same angular position as each other on said transverse shaft.

2. Percussive apparatus according to claim 1, in which said striker is mounted for reciprocation on parallel guide bars, said striker being provided with bores through which said guide bars extend, and said guide bars being arranged to pass through spaces formed between the two fly-weights on one side of said striker and the two fly-weights on the other side of said striker.

3. Percussive apparatus according to claim 1, wherein said drive shaft comprises a splined drive shaft carried on said striker so as to reciprocate with said striker, there being coupling means co-operating with said splined drive shaft to connect said shaft to said electric motor, a plurality of springs being provided within said casing to cushion said striker during reciprocation thereof.

References Cited by the Examiner

UNITED STATES PATENTS

| 2,545,245 | 3/1951 | Stutz | 173—49 |
| 2,743,585 | 5/1956 | Berthet et al. | 173—49 |
| 2,897,734 | 8/1959 | Bodine | 173—49 |
| 3,008,528 | 11/1961 | Berthet et al. | 173—49 |

FOREIGN PATENTS

| 822,979 | 11/1951 | Germany. |
| 81,820 | 1956 | Netherlands. |

FRED C. MATTERN, JR., Primary Examiner.

MILTON KAUFMAN, Examiner.

L. P. KESSLER, Assistant Examiner.